(12) United States Patent
Cabrera et al.

(10) Patent No.: US 9,077,643 B1
(45) Date of Patent: *Jul. 7, 2015

(54) PROGRAMMATICALLY SIMULATING SYSTEM CONDITIONS

(71) Applicant: Amazon Technologies, Inc., Reno, NV (US)

(72) Inventors: Luis Felipe Cabrera, Bellevue, WA (US); Peter N. De Santis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,121

(22) Filed: Dec. 4, 2013

Related U.S. Application Data (63) Continuation of application No. 13/072,539, filed on Mar. 25, 2011, now Pat. No. 8,626,827.

(51) Int. Cl.
*H04L 29/06* (2006.01)
*H04L 12/24* (2006.01)

(52) U.S. Cl.
CPC .................................. *H04L 41/145* (2013.01)

(58) Field of Classification Search
CPC ..... H04L 41/14; H04L 41/142; H04L 41/145; H04L 41/147
USPC ................................................. 709/203, 229
See application file for complete search history.

(56) References Cited

U.S. PATENT DOCUMENTS

| | | | | |
|---|---|---|---|---|
| 6,275,785 | B1 * | 8/2001 | Currie et al. ..................... | 703/13 |
| 7,184,945 | B1 * | 2/2007 | Takahashi et al. ............... | 703/22 |
| 8,285,822 | B2 * | 10/2012 | K. .................. | 709/220 |
| 2004/0117460 | A1 * | 6/2004 | Walsh et al. ................... | 709/219 |
| 2004/0221177 | A1 * | 11/2004 | Koops ........................... | 713/201 |
| 2005/0027837 | A1 * | 2/2005 | Roese et al. ..................... | 709/223 |
| 2005/0100032 | A1 * | 5/2005 | Patiejunas ..................... | 370/410 |
| 2005/0132064 | A1 * | 6/2005 | Lo .................. | 709/227 |
| 2005/0203995 | A1 * | 9/2005 | Schumacher ................. | 709/203 |
| 2007/0147357 | A1 * | 6/2007 | Pelletier et al. ............... | 370/356 |
| 2008/0159168 | A1 * | 7/2008 | Ariyoshi et al. .............. | 370/253 |
| 2008/0222731 | A1 * | 9/2008 | Dowd et al. ..................... | 726/25 |
| 2008/0228866 | A1 * | 9/2008 | Minatogawa et al. ........ | 709/203 |
| 2008/0263400 | A1 * | 10/2008 | Waters et al. ................... | 714/30 |
| 2009/0182605 | A1 * | 7/2009 | Lappas et al. ..................... | 705/8 |
| 2009/0187968 | A1 * | 7/2009 | Roese et al. ..................... | 726/1 |
| 2009/0327909 | A1 * | 12/2009 | Hayton ......................... | 715/744 |
| 2010/0161789 | A1 * | 6/2010 | Walia et al. ................... | 709/224 |
| 2010/0218104 | A1 * | 8/2010 | Lewis ......................... | 715/736 |
| 2011/0055136 | A1 * | 3/2011 | Hamilton et al. .............. | 706/47 |
| 2011/0087522 | A1 * | 4/2011 | Beaty et al. ................. | 705/7.38 |
| 2011/0125873 | A1 * | 5/2011 | Pacella et al. ................. | 709/219 |
| 2012/0060167 | A1 * | 3/2012 | Salsburg et al. ............. | 718/104 |

* cited by examiner

*Primary Examiner* — Andrew Chriss
*Assistant Examiner* — Rasha Fayed
(74) *Attorney, Agent, or Firm* — Seed IP Law Group PLLC (57) ABSTRACT

Systems and methods are provided for programmatically simulating one or more system conditions for a network resource using one or more services. In one implementation, a server receives a request to initiate a treatment. The request identifies a treatment definition. The server determines, based on the treatment definition, the one or more services and deploys the one or more services to the network resource. The one or more services simulate the one or more system conditions.

25 Claims, 3 Drawing Sheets

PROGRAMMATICALLY SIMULATING SYSTEM CONDITIONS

BACKGROUND

A modern computer network system typically includes a variety of components. For example, in packet-switched computer networks, such as the Internet or local area networks (LANs), logically addressed data packets are sometimes routed from a source to a destination through one or more intermediate nodes. The intermediate nodes may comprise hardware components, such as routers, which direct and control the flow of data through the networks. Networks also may include other components, such as servers, bridges, gateways, firewalls, and switches, through which data packets may travel.

A network system may experience a variety of events that can cause a degradation in its performance. For example, increased data loads can affect the performance of network components, such as routers, and slow the ability of a network to distribute data. Increased compute loads can stress the capabilities of servers. Other events, such as a denial-of-service (DoS) attack or a distributed denial-of-service (DDoS) attack, can overwhelm and cripple a server with large volumes of communications requests. As further examples, network components may experience packet loss, causing data packets to fail to reach a destination, or packet corruption, causing data packets to arrive at a destination with errors. Unexpected disruptions and delays can impact an entity's ability to function in a timely and efficient manner.

To prevent unexpected disruptions and delays, an entity may wish to understand how a configuration of a particular set of provisioned resources, such as network components and servers, will react under certain conditions that may impact performance. However, testing such resources can be time consuming and expensive. For example, one way to test network components is through the use of hardware components that are designed for testing purposes. Such hardware components can be used to determine whether a device is functioning properly. However, these components require configuration that is time consuming, costly, and complex. Furthermore, users of hosted environments, such as those in a public cloud computing environment, are unable to directly conduct such tests because such users are making use of an infrastructure that is within another party's control.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

Disclosed systems and methods allow a user of a hosted environment to programmatically simulate system conditions, such as failures or other unusual conditions, in a distributed environment. In some embodiments, the hosted computing environment ("hosted environment") is a public cloud that allows for on-demand provisioning of compute resources, such as virtualized or non-virtualized compute nodes, storage devices, routers, switches, and load balancers. The provisioned resources may be configured in various ways to meet the user's needs. For example, users may select a number of provisioned nodes, a configuration (e.g., operating system type, memory allocation, CPU speed, and storage size) of provisioned nodes, and networking topology.

Through the use of application programming interfaces (APIs) implemented by the disclosed systems, a user may introduce system conditions such as various network loads and a variety of partial and complete server failure scenarios into the user's configured environment. For example, the system may generate an arbitrary packet load on a host computer to simulate DDoS scenarios. A user also may instruct the system to introduce environment failure scenarios by using the APIs. These APIs may, for example, simulate crashing a computer and bringing the computer back online after a specified amount of time, set a computer to randomly appear and disappear from a network to simulate a bad network card or router port, or create a partial or complete network partition amongst a set of computers, among other possibilities. Furthermore, for example, the systems can be used to artificially introduce packet corruption, packet loss, and/or packet duplication between host computers.

In one embodiment, a computer-implemented method programmatically simulates one or more system conditions for a network resource using one or more services. A server may receive a treatment definition that includes data identifying one or more services and the network resource. The server may receive a request to initiate the treatment. The server may determine, based on the treatment definition, one or more services and deploy the identified services to the network resource to simulate one or more system conditions at the network resource.

In other embodiments, a system may include a processor for executing program instructions and a computer-readable storage medium (e.g., a memory) storing the program instructions. The program instructions, when executed by the processor, may perform the method discussed above.

Figure 1:
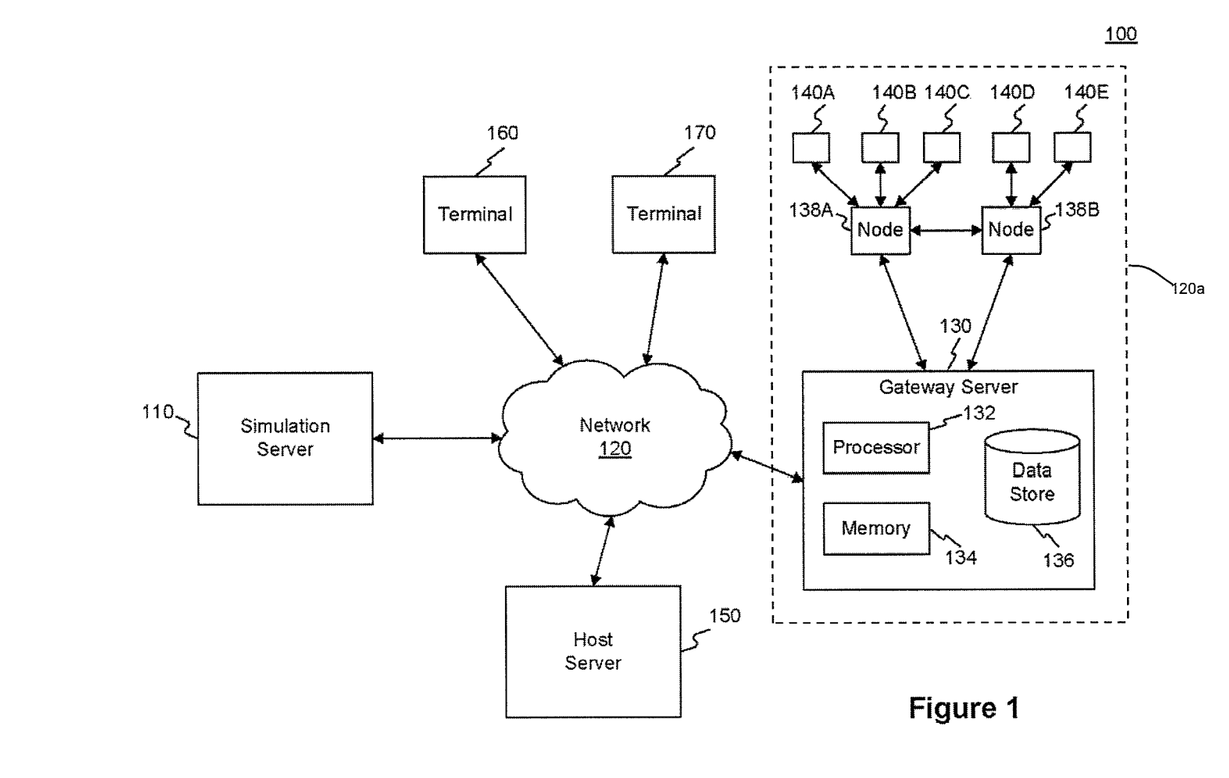
FIG. 1 is a diagram of an example of a system for programmatically simulating conditions for one or more network resources.

FIG. 1 is an example of a system 100 that enables a user to programmatically simulate conditions for one or more network resources, consistent with a disclosed embodiment. In FIG. 1, system 100 includes a network 120 that interconnects a simulation server 110, a gateway server 130, nodes 138A and 138B, endpoints 140A-140E, a host server 150, and terminals 160 and 170. System 100 may provide functionality that enables the user to programmatically simulate conditions for network resources of system 100 (e.g., one or more of simulation server 110, gateway server 130, nodes 138A and 138B, endpoints 140A-140E, host server 150, and terminals 160 and 170).

System 100 may be representative of a portion of a hosted environment (e.g., a public cloud that facilitates the provisioning of network resources), and system 100 may provide functionality for simulating conditions or events in the hosted environment, such as DoS/DDoS attacks, computing system failures, increased network traffic, and packet loss, packet duplication, and/or packet corruption conditions.

Such functionality may be provided through a user interface or an application programming interface (API) that forwards requests for various simulation services to simulation server 110 across network 120. In such embodiments, a request for a service may encompass any direct or indirect mechanism by which simulation server 110 (or other software residing on another computer) provides information that invokes certain behavior in another software component.

One of skill in the art will appreciate that although a certain number of each component is depicted in FIG. 1, any number of these components may be provided. For example, one of skill in the art will recognize that one or more components of system 100 may be combined and/or divided into subcomponents. Furthermore, one of skill in the art will recognize that system 110 may include additional or fewer components, and may be arranged in alternative configurations.

Network 120 provides communications between the various network resource components in system 100, such as simulation server 110, gateway server 130, host server 150, and terminals 160 and 170. Terminals 160 and 170 may provide interfaces for a user to define simulation conditions for network resources of system 100. In addition, simulation server 110, gateway server 130, host server 150, and terminals 160 and 170 may access legacy systems (not shown) via network 120, or may directly access legacy systems, data stores, or other network applications. For example, these legacy systems may include obsolete components and applications that are accommodated by system 100, for example, due to necessity or due to an association with certain data.

Network 120 may be a shared, public, or private network, may encompass a wide area or local area, and may be implemented through any suitable combination of wired and/or wireless communication networks. Network 120 may further comprise an intranet or the Internet.

Simulation server 110 may comprise a general purpose computer (e.g., a personal computer, network computer, server, or mainframe computer) having one or more processors that may be selectively activated or reconfigured by a computer program stored in memory. Simulation server 110 may be implemented in a distributed network, such that simulation server 110 may communicate via network 120 with additional simulation servers (not shown). Alternatively, simulation server 110 may be specially constructed for carrying-out methods consistent with disclosed embodiments.

Gateway server 130 may include a processor 132, a memory 134, and a data store 136. Memory 134 may comprise one or more memory or storage devices that store data as well as software. Memory 134 may also comprise, for example, one or more of RAM, ROM, magnetic storage, or optical storage. Memory 134 may store program modules that, when executed by processor 122, perform one or more processes for storing and/or accessing data residing on data store 136. Data store 116 may store applications, libraries, data, and associated configuration settings for one or more entities.

As depicted, gateway server 130 may communicate with nodes 138A-138B, which may, in turn, communicate with endpoints 140A-140E via data links (e.g., wired or wireless links). For example, gateway server 130, nodes 138A-138B, and endpoints 140A-140E may constitute a local area network (LAN) 120a that is distinct from network 120. In such embodiments, nodes 138A and 138B, and additionally or alternatively, endpoints 140A-140E, may be associated with communications protocols that are incompatible with the communications protocols of network 120, and may communicate with network 120 through gateway server 130.

LAN 120a may be part of or constitute a hosted environment in which one or more entities can provision gateway server 130, nodes 138A and 138B, and endpoints 140A-140E in order to execute various applications. Nodes 138A and 138B may constitute any network resource or component, such as routers, servers, bridges, gateways, firewalls, and switches, through which data packets may travel. Endpoints 140A-140E may be any type device that communicates through nodes 138A-138B. For example, endpoints 140A-140E may be personal computers, handheld devices (e.g., PDAs, cellular phones, workstations, etc.), servers, or any other appropriate computing platform or device capable of exchanging data with gateway server 130. Endpoints 140A-140E may each include a processor (not shown) and a memory (not shown).

Host server 150 may comprise a general purpose computer (e.g., a personal computer, network computer, server, or mainframe computer) having one or more processors that may be selectively activated or reconfigured by a computer program. Host server 150 may be implemented in a distributed network. For example, host server 150 may communicate via network 120 with additional servers (not shown), which may enable host server 150 to distribute processes for parallel execution by a plurality of servers. Although not depicted in FIG. 1, in one embodiment, host server 150 may include components (e.g. memory, processor, etc.) that are equivalent to those of gateway server 130.

Furthermore, consistent with disclosed embodiments, simulation server 110 may also programmatically simulate network conditions at gateway server 130 and/or host server 150. For example, in such embodiments, a user at one of network terminals 160 and 170 may coordinate with simulation server 110 to programmatically simulate a system condition at gateway server 130 and/or host server 150. A user at one of network terminals 160 and 170 may further monitor a performance metric of one or more components of system 100 in response to the simulated system condition.

Terminals 160 and 170 may be any type device for communicating with simulation server 110, gateway server 130, and/or host server 150. For example, terminals 160 and 170 may be personal computers, handheld devices (e.g., PDAs, cellular phones, workstations, etc.), servers, or any other appropriate computing platform or device capable of exchanging data with simulation server 110, gateway server 130, and/or host server 150. Terminals 160 and 170 may each include a processor (not shown) and a memory (not shown). Furthermore, terminals 160 and 170 may execute program modules that provide one or more graphical user interfaces (GUIs) for interacting with simulation server 110, gateway server 130, and/or host server 150. Alternatively, in other embodiments, users of terminals 160 and 170 may access data through other network mechanisms, such as through an API of one or more services (e.g., a web service).

In one embodiment, simulation server 110 may provide functionality for simulating conditions or events at one or more components in a distributed environment. For example, network resources of LAN 120a of FIG. 1, such as gateway server 130 and nodes 138A and 138B are shared by several clients (e.g., endpoints 140A-140E). Consistent with disclosed embodiments, simulation services may be executed by a network resource (e.g., gateway server 130 and nodes 138A-138B), or may be executed by a virtualized host (e.g., a virtual node associated with gateway server 130) to selectively manipulate packet streams. For example, the manipulation of the packet streams may be based upon a treatment specified by a user for a particular network resource or a set of network resources.

A treatment may comprise one or more simulation services designed to create or simulate certain network conditions or events. For example, in one embodiment, a simulation service may simulate a failure of certain nodes in a network (e.g., one or more of nodes 138A and 138B), introduce latency into a network, perform load simulations, test recovery code, or power off a server (e.g., one or more of 140A-E) to simulate a failure. In other embodiments, a simulation service may simulate a failure of a network resource by returning a message indicative of failure in reply to a request. In still other embodiments, a simulation service may apply a particular data load on, for example, host server 150. Such a simulation may increase a load of host server 150 over a period of time (e.g., an hour, two hours, a day). In yet other embodiments, a simulation service may specify a data rate at which packets should be corrupted (e.g., corrupt one in a million packets, corrupt two in a million packets, etc.). This rate can be configured to increase over time such that a breaking point or negative performance threshold of a network or network component can be determined. In still other embodiments, a simulation service may specify a packet loss rate to be introduced at one or more network components. Accordingly, one or more simulation services may manipulate packet streams such that a user can monitor and determine how a network or other component responds (e.g., whether the network or component recovers).

Figure 2:
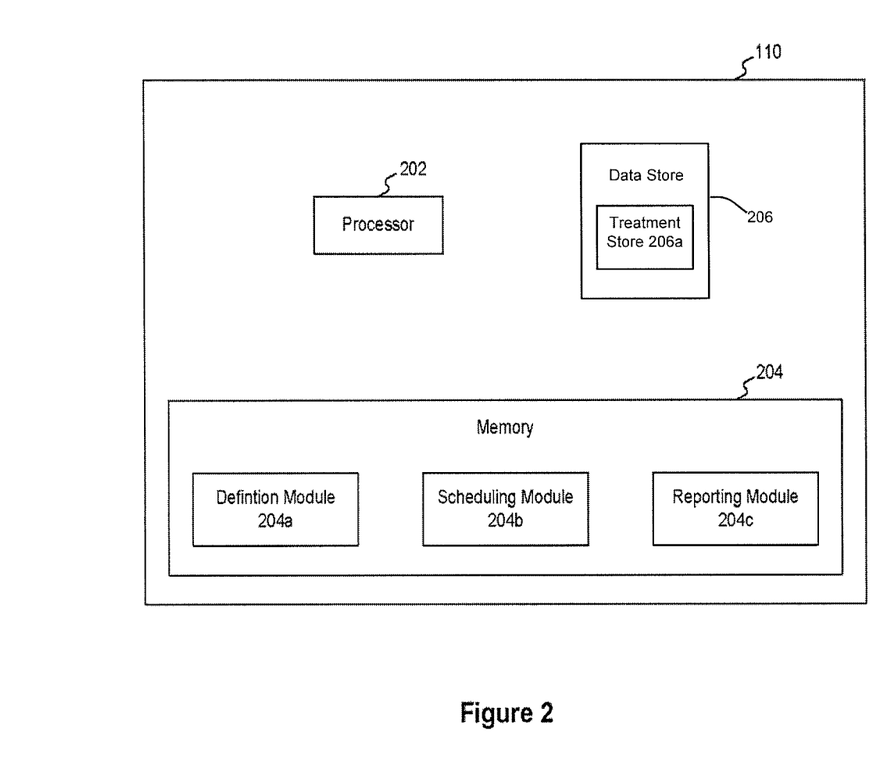
FIG. 2 shows a diagram of an example of an architecture of a simulation server, consistent with a disclosed embodiment.

FIG. 2 shows a diagram of an example of an architecture of simulation server 110, consistent with a disclosed embodiment. As discussed above, simulation server 110 may provide functionality for simulating certain events or conditions through the use of treatments and services. Furthermore, simulation server 110 may enable the scheduling, execution, monitoring, and reporting of data related to executed treatments.

Simulation server 102 may include a processor 202, a memory 204, and a data store 206. Data store 206 may include a treatment store 206a, which may store data reflecting treatments. For example, treatment store 206a may store data reflecting certain predefined treatments and/or data reflecting user-defined, customized treatments. For a particular entity, treatment store 206a may store data specifying certain simulation services an entity has selected for execution and may further include data specifying scheduling information pertaining to the simulation services.

Memory 204 may be one or more memory or storage devices that store data as well as software. Memory 204 may comprise, for example, one or more of RAM, ROM, magnetic storage, or optical storage. Furthermore, memory 204 may store programming modules, which when executed by processor 202, perform one or more processes for simulating conditions or events for a network or a network component. For example, memory 204 may include a definition module 204a, a scheduling module 204b, and a reporting module 204c, as shown in FIG. 2.

Definition module 204a may provide functionality that enables a user at one of terminals 160 and 170 to define a treatment. The definition of a treatment may include, but is not limited to, a specification of a network resource that should receive the treatment and an identification of one or more simulation services associated with the treatment. For example, the network resource may include one or more of endpoints 140A-140E, nodes 138A and 138B, gateway server 130, and host server 150, and the network resource may be specified using one or more of an IP address, a uniform resource identifier (URI), a uniform resource locator (URL), an account hosted on the network resource (e.g., on gateway server 130 or host server 150), and any additional or alternate identifier of the network resource.

As described above, the definition of the treatment may also identify one or more simulation services designed to create or simulate certain system conditions. For example, using one or more simulation services as building blocks, the user may create arbitrary loads and hardware conditions at a component of system 100. Such simulation services may be initiated through the use of application programming interfaces (APIs) and/or may be defined and/or scheduled through a user interface.

Further, the definition of a treatment may be preexisting (e.g., a predefined treatment definition stored in data store 206) or may be user defined (e.g., a user at one of terminals 160 and 170 may customize a treatment by selecting services and associated parameters that comprise a treatment). Definition module 204a may further store treatment definitions in treatment store 206a of data store 206.

Scheduling module 204b may provide functionality for scheduling treatments. For example, a user at one of terminals 160 and 170 may schedule a treatment to occur at a particular time (i.e., a one-time simulation) or schedule a treatment to occur on a periodic basis (i.e., a regularly-scheduled simulation). Alternatively, a user may schedule a treatment to occur when certain network conditions are met (e.g., when data loads are low). At the time a treatment is to be executed, scheduling module 204b may retrieve data defining one or more treatments from data store 206 and deploy appropriate services to implement the defined one or more treatments.

Reporting module 204c may monitor and record results of treatments, and may generate logs or reports. For example, simulation server 110 may monitor a network or network component and provide a report summarizing or detailing a treatment. Such a report may include diagnostic information, such as a timeline of the simulation that indicates which services were deployed and when. A user who requested the simulation may correlate the report to the user's data. For example, the report may be correlated to system monitoring data logged by the user during the simulation of the system condition. In such embodiments, the correlated data may be stored, for example, in memory 204 of simulation server 110.

As discussed above, a treatment may comprise one or more simulation services designed to create or simulate certain network or component conditions. For example, using one or more simulation services as building blocks, one may recreate arbitrary loads and hardware conditions. These simulation services may be initiated through the use of application programming interfaces (APIs) and/or may be defined and/or scheduled through a user interface. The following provides an overview of illustrative simulation services.

For example, simulation server 110 may enable a user to simulate a DDoS attack on a network resource of system 100. A user at one of network terminals 160 and 170 may establish a communication session with simulation server 110. The user may subsequently define a treatment that applies one or more "load" services to a network resource (e.g., host server 150 or gateway server 130) using definition module 204a, and may schedule the treatment, e.g., at a particular time or at periodic times, using scheduling module 204b.

Simulation server 110 may subsequently deploy the defined treatment to the network resource at the scheduled time. In such embodiments, the specified "load" service associated with the treatment may generate and execute code that produces requests of a given kind up to a capacity of the network resource. As the deployed treatment may include one or more of such "load" services, the deployed treatment may simulate a desired load for the network resource. Furthermore, the use of multiple load services may enable the user to specify a rate at which a load of the network resource increases towards the desired load.

Reporting module 204c may monitor and record results of the treatment applied to the specified network resource, and additionally or alternatively, the results of the treatment on the performance of other network resources within system 100. For example, in such embodiments, reporting module 204c may monitor the performance of one or more of endpoints 140A-140E in response to a desired loading of host server 150 or gateway server 150.

As an additional example, simulation server 110 may enable a user to programmatically simulate of a failure of a network resource, and a subsequent recovery of that network resource, e.g., a reboot of the network resource triggered by a recovery code. In such embodiments, simulation server 110, using APIs, may programmatically simulate a "crash" of a network resource and subsequent recovery (e.g., reboot) after a specified time period, an appearance and/or disappearance of a network resource (e.g., due to a bad network card or router port), and a creation of a partial or complete network partition among network resources of system 100.

For example, the user may establish a communication session with simulation server 110 across network 120, and may subsequently define a treatment that prevents a network resource (e.g., endpoints 104A-140E, nodes 138A and 138B, host server 150, or gateway server 130) from receiving data packets for a specified period of time. Once defined, the user may interact with scheduling module 204b to schedule the application of the treatment, e.g., at a particular time or at periodic intervals.

As discussed above, simulation server 110 may subsequently deploy the defined treatment to the network resource at the scheduled time. In such embodiments, a service associated with a deployed treatment may generate and execute code to block the receipt of incoming data packets at the network resource. Reporting module 204c of simulation server 110 may monitor and record results of the treatment applied to the specified network resource, and additionally or alternatively, the results of the treatment on the performance of other network resources within system 100.

In a further example, simulation server 110 may enable a programmatic simulation of a loss, corruption, and duplication of data packets at a network resource. In such embodiments, a user at one of network terminals 160 and 170 may establish a communication session with simulation server 110, and may subsequently define a treatment that applies one or more "packet muncher" services to the network resource (e.g., endpoints 104A-140E, nodes 138A and 138B, host server 150, or gateway server 130) using definition module 204a. The user may subsequently coordinate with scheduling module 204b to schedule the treatment at a particular time or at periodic intervals.

In such embodiments, the packet muncher services may include, but are not limited to, services that cause a network resource to receive a packet and not retransmit the packet (i.e., to lose a packet), to receive a packet and to retransmit the packet with bits changed (i.e., to corrupt a packet), or to receive a packet and transmit the packet twice, with a variable length latency between the two packets (i.e., to duplicate packets). However, the disclosed embodiments are not limited to such exemplary services, and in additional embodiments, the user may define a treatment to include any additional or alternate service that modifies or otherwise corrupts a data packet processed by the network resource.

Simulation server 110 may subsequently deploy the defined treatment to the network resource at the scheduled time. In such embodiments, the specified service associated with the treatment may generate and execute code that loses, corrupts, or duplicates data packets at the network resource, as discussed above. Reporting module 204c may monitor and record results of the treatment applied to the network resource, and additionally or alternatively, the results of the treatment on the performance of other network resources within system 100. For example, in such embodiments, reporting module 204c may monitor the performance of one or more of endpoints 140A-140E in response to a corruption of data packets by gateway server 150 or nodes 130A and 138B.

Although described in terms of services that generate code for execution by a networked resource, the treatments defined by simulation server 110 are not limited to such exemplary services. For example, the user may supply code to generation module 204a, and the supplied code may be incorporated into the defined treatment by simulation server 110. In such embodiments, the defined treatment may be deployed to the network resource, which may execute the user-supplied code to simulate the desired system condition.

As discussed above, a user may access simulation server 110 through a user interface associated with terminals 160 and 170, or alternatively, through a programmatic interface (e.g., an API) associated with terminals 160 and 170. In an embodiment, access to simulation server 110, and the ability to programmatically simulate system conditions based on treatments generated by simulation server 110, may be provided at no charge to the user. For example, the user may submit a payment to access the network and compute facilities of system 100. In some implementations, access may be provided to simulation server 110 at no additional charge.

However, in additional embodiments, the user may access simulation server 110 upon payment of a fee, e.g., an access fee, to an entity associated with system 100. For example, such access fees may accrue on an hourly, daily, or monthly basis, or alternatively, may be due upon each successful attempt to access simulation server 110.

Additionally, third-party entities (e.g., developers not associated with system 100) may develop services and/or treatments that may be available to users of simulation server 110. In such embodiments, a user may pay to access the developed services and/or treatments, and the resulting revenue may be shared between the third-party developer and the entity associated with system 100.

Figure 3:
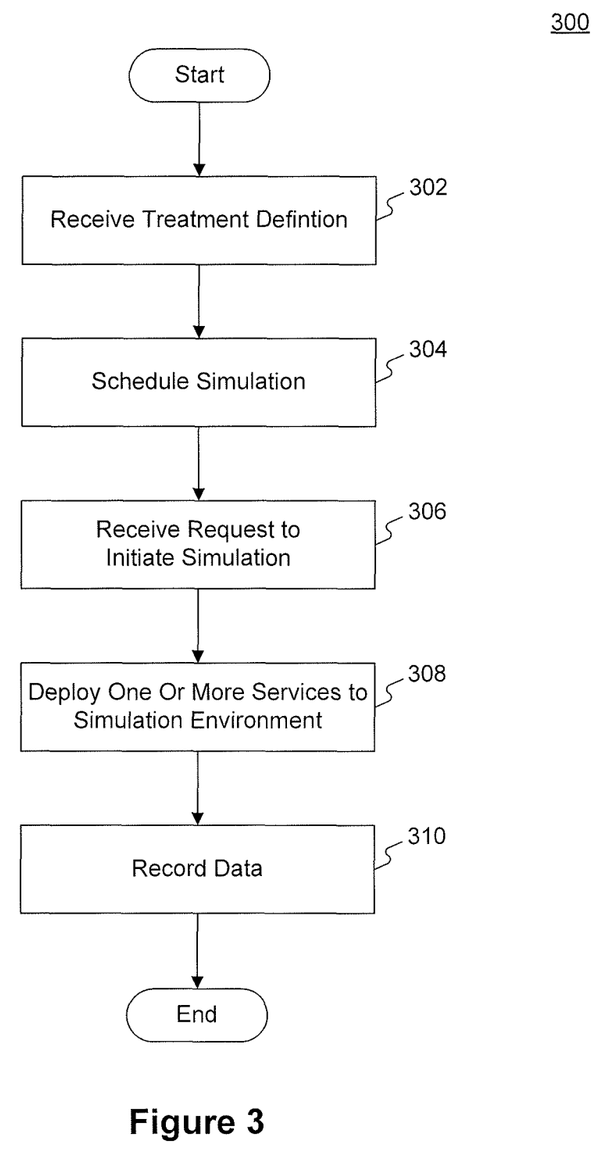
FIG. 3 is a flow diagram of an example of a routine for programmatically simulating conditions for one or more network resources.

FIG. 3 is a flow diagram of an example of a routine 300 for programmatically simulating conditions for one or more network resources, consistent with a disclosed embodiment. Routine 300 provides an overview of a process in which simulation server 110 enables an entity to define, schedule, and deploy treatments.

Prior to the start of routine 300, a user may be authenticated by, for example, simulation server 110. For example, prior to the start of routine 300, simulation server 110 may transmit a document (e.g., a web page) that is accessible by an Internet browser executing on, for example, terminal 160. The document may include options for a user to log onto a secure site provided by simulation server 110. The user may log onto the secure site by supplying credentials, such as a username and a password. Once authenticated, routine 300 may begin.

In block 302, simulation server 110 may receive a treatment definition. Simulation server 110 may store the treatment definition in data store 206. For example, a user at one of terminals 160,170 may define one or more treatments and submit the definitions to simulation service 110. As discussed above, a definition of the treatment may specify a network resource that should receive the treatment using, for example, a URL, a URI, an IP address, and an account hosted on the network resource (e.g., on gateway server 130 or host server 150. Furthermore, a treatment may comprise one or more simulation services.

In block 304, simulation server 110 may schedule the treatment. As discussed above, a user at one of terminals 160 and 170 may schedule the treatment. Simulation server 110 may store data reflecting the scheduling of the treatment in data store 206.

In block 306, simulation server 110 may receive a request to initiate a simulation. For example, simulation services may be initiated through the use of application programming interfaces (APIs) and/or may be requested by scheduling module 204b. As part of block 306, simulation server 110 may determine one or more services that are defined by a treatment. For example, as part of block 306, simulation server 110 may retrieve a treatment definition from data store 206.

In block 308, simulation server 110 may deploy one or more services to an environment specified by the treatment definition. The environment may correspond to one or more network components and the services may cause one or more conditions to occur at the specified endpoint. For example, simulation server 110 may retrieve data defining one or more treatments from data store 206 and deploy one or more simulation services to implement the defined one or more treatments. For example, a simulation service may cause an arbitrary piece of code to produce a plurality of requests of a particular kind. The plurality of requests may be produced up to a capacity of a machine that hosts the service (e.g., host server 150). Alternatively, a simulation service may receive a packet and not retransmit the packet (i.e., lose a packet), receive a packet and retransmit the packet with one or more changed bits (i.e., corrupt a packet), or receive a packet and transmit the packet two or more times (i.e., duplicate a packet). Duplicated packets may be transmitted with a variable length latency between transmission of the two or more packets.

In block 310, simulation server 110 may record performance information and/or record data pertaining to the one or more treatments. For example, simulation server 110 may monitor and record results of the one or more treatments and may use the recorded data to generate a log or report. The log or report may identify the one or more services that were deployed, along with information identifying the date and time of the deployment and execution. Simulation server 110 may transmit the log or report to a user at one of terminals 160 and 170 upon request or automatically upon completion of the simulation.

As one of ordinary skill in the art will appreciate, one or more of blocks 302-310 may be optional and may be omitted from implementations in certain embodiments. Furthermore, functionality provided by one or more of blocks 302-310 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone.

Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method comprising:
   receiving, by a configured server device of a hosted computing environment, a request from a user of the hosted computing environment to provide one or more indicated simulation services for an indicated type of network resource;
   providing, in the hosted computing environment on behalf of the user, a physical copy of a network resource of the indicated type that is under control of the hosted computing environment; and
   deploying, by the hosted computing environment, the one or more indicated simulation services in the hosted computing environment to simulate one or more system conditions for the provided physical copy of the network resource.

2. The computer-implemented method of claim 1 wherein the one or more indicated simulation services are selected by the user from a plurality of predefined treatments available from the hosted computing environment that each has one or more associated simulation services.

3. The computer-implemented method of claim 1 wherein the receiving of the request from the user further includes receiving definitions of the one or more indicated simulation services from the user, and wherein the deploying of the one or more indicated simulation services includes using the received definitions from the user.

4. The computer-implemented method of claim 1 wherein the provided physical copy of the network resource is a server computing system.

5. The computer-implemented method of claim 4 wherein the deploying of the one or more indicated simulation services causes the server computing system to shut down.

6. The computer-implemented method of claim 1 wherein the deploying of the one or more indicated simulation services causes a predetermined load at the provided physical copy of the network resource.

7. The computer-implemented method of claim 1 wherein the deployed one or more indicated simulation services operate to, for one or more packets received at the provided physical copy of the network resource, prevent retransmission of the one or more packets.

8. The computer-implemented method of claim 1 wherein the deployed one or more indicated simulation services operate to, for a packet received at the provided physical copy of the network resource, retransmit the packet with one or more changed bits.

9. The computer-implemented method of claim 1 wherein the deployed one or more indicated simulation services operate to, for a packet received at the provided physical copy of the network resource, transmit the packet two or more times from the provided physical copy of the network resource.

10. The computer-implemented method of claim 1 further comprising generating a report to indicate results of the deploying, and providing the generated report to the user.

11. The computer-implemented method of claim 1 wherein the received request from the user further indicates a type of event, and wherein the method further comprises monitoring for the type of event and, in response to detecting the type of event from the monitoring, performing the deploying of the one or more indicated simulation services.

12. The computer-implemented method of claim 1 wherein the hosted computing environment provides an application programming interface (API) to enable users to supply programmatic requests, and wherein the request is received from the user via the provided API.

13. The computer-implemented method of claim 1 further comprising obtaining, by the hosted computing environment, one or more fees from the user for the providing of the physical copy of the network resource and the deploying of the one or more indicated simulation services.

14. The computer-implemented method of claim 1 wherein the providing of the physical copy of the network resource includes selecting the network resource from a plurality of network resources provided by the hosted computing environment, and provisioning the selected network resource for use on behalf of the user.

15. A system comprising:
a processor of a server device associated with a hosted computing environment; and
a memory storing program instructions that, when executed by the processor, configure the server device to:
receive a request from a user of the hosted computing environment to initiate providing one or more indicated simulation services to simulate one or more indicated system conditions for an indicated type of network resource in exchange for one or more fees paid by the user;
provide, in response to the received request and in the hosted computing environment on behalf of the user, a physical copy of a network resource of the indicated type; and
deploy the one or more indicated simulation services on computing resources in the hosted computing environment to interact with the provided physical copy of the network resource and simulate the one or more indicated system conditions at the provided physical copy of the network resource.

16. The system of claim 15 wherein the one or more indicated simulation services include at least one simulation service that is selected by the user from a plurality of predefined simulation services available from the hosted computing environment.

17. The system of claim 16 wherein the one or more indicated simulation services further include at least one additional simulation service that is specified by the user, and wherein the deploying of the one or more indicated simulation services includes using a definition received from the user for the at least one additional simulation service.

18. The system of claim 16 wherein the provided physical copy of the network resource is a server computing system, and wherein the deploying of the one or more indicated simulation services causes a predetermined load at the server computing system.

19. The system of claim 15 wherein the program instructions further configure the server device to deploy one or more additional indicated services at the provided physical copy of the network resource to receive one or more packets at the provided physical copy of the network resource and to prevent retransmission of the one or more packets.

20. The system of claim 15 wherein the program instructions further configure the server device to deploy one or more additional indicated services at the provided physical copy of the network resource to receive a packet at the provided physical copy of the network resource, and to retransmit the packet from the provided physical copy of the network resource with one or more changed bits or to transmit the packet two or more times from the provided physical copy of the network resource.

21. The system of claim 15 wherein the hosted computing environment provides an application programming interface (API) to enable users to supply programmatic requests, and wherein the request is received from the user via the provided API.

22. The system of claim 21 wherein the providing of the physical copy of the network resource includes selecting the network resource from a plurality of network resources provided by the hosted computing environment, and provisioning the selected network resource in an indicated manner for the user.

23. A non-transitory computer-readable storage medium having stored program instructions that, when executed, cause a server device of a hosted computing environment to:
receive a request from a user of the hosted computing environment to provide one or more indicated simulation services for an indicated type of network resource in exchange for one or more fees paid by the user;
provide, in response to the received request, a physical copy of the network resource of the indicated type in the hosted computing environment on behalf of the user; and
deploy the one or more indicated simulation services on computing resources in the hosted computing environment to interact with the provided physical copy of the network resource and to simulate one or more system conditions at the provided physical copy of the network resource.

24. The non-transitory computer-readable storage medium of claim 23 wherein the hosted computing environment provides an application programming interface (API) to enable users to supply programmatic requests, and wherein the request is received from the user via the provided API.

25. The non-transitory computer-readable storage medium of claim 23 wherein the providing of the physical copy of the network resource includes selecting the network resource from a plurality of network resources provided by the hosted computing environment, and provisioning the selected network resource in an indicated manner for the user.

* * * * *